United States Patent

Kim

[11] Patent Number: 6,009,060
[45] Date of Patent: Dec. 28, 1999

[54] DISK PLAYER DISK TRAY HAVING A PROTECTIVE LAYER

[75] Inventor: In-soo Kim, Suwon, Rep. of Korea

[73] Assignee: Samsung Electronics Co., Ltd., Kyungki-do, Rep. of Korea

[21] Appl. No.: 08/972,749

[22] Filed: Nov. 18, 1997

[30] Foreign Application Priority Data

Nov. 18, 1996 [KR] Rep. of Korea ............... 96-54995

[51] Int. Cl.$^6$ ................................ G11B 33/08
[52] U.S. Cl. ............................ 369/77.1; 369/263
[58] Field of Search ..................... 369/75.1, 77.1, 369/263, 264; 360/97.02

[56] References Cited

U.S. PATENT DOCUMENTS 4,337,533  6/1982  Ando et al. ............... 369/77.1
5,088,076  2/1992  Serita et al. .............. 369/77.1

FOREIGN PATENT DOCUMENTS 3-104054  5/1991  Japan .

*Primary Examiner*—George J. Letscher
*Attorney, Agent, or Firm*—Sughrue, Mion, Zinn, Macpeak & Seas, PLLC

[57] ABSTRACT

A disk tray for a disk player including a tray main body installed on a disk player main body which carries a disk in and out of the disk player main body. The disk tray has a disk accommodating portion which is indented to accommodate a disk, and a protective layer formed on the surface of the disk accommodating portion facing an accommodated disk for protecting the disk placed on the disk accommodating portion.

3 Claims, 2 Drawing Sheets

DISK PLAYER DISK TRAY HAVING A PROTECTIVE LAYER

BACKGROUND OF THE INVENTION

1. Field of the Invention

The present invention relates to a disk tray for a disk player, and more particularly, to a disk tray for a disk player having an improved structure so that a disk placed thereon can be protected.

2. Description of the Related Art

In general, a disk player which adopts a disk such as a compact disk (CD), a digital video disk (DVD) or a laser disk (LD) to record/reproduce information uses a disk tray to load the disk on a turntable of a main unit.

Referring to FIG. 1, a conventional disk tray 20 for a disk player is installed to be capable of reciprocating above the deck 10. The disk tray 20 comprises a tray main body 21 having a disk accommodating portion 23 and a cushion member 25 installed on the disk accommodating portion 23.

The tray main body 21 is installed on the deck 10 to be capable of reciprocating and is driven by power provided from a driving motor (not shown) installed on the deck 10. The disk accommodating portion 23 is formed of first and second disk accommodating portions 23a and 23b each having a different depth and diameter to correspond to disks of different sizes. That is, the first disk accommodating portion 23a is for accommodating a disk 1 having a diameter of 120 mm. The second disk accommodating portion 23b is further indented to a depth greater than that of the first disk accommodating portion 23a to accommodate a disk (not shown) having a diameter of 80 mm. Therefore, by respectively forming the first and second disk accommodating portions 23a and 23b, a disk which is placed on the tray main body 21 is guided to an appropriate position.

A plurality of cushion members 25 are attached on the second disk accommodating portion 23b. The cushion members 25 support a disk placed on the second disk accommodation portion 23b and prevents damage to the disk. Also, impacts to the tray main body may be prevented from being transmitted to the disk by the cushion members 25.

However, in the conventional disk tray 20 for a disk player, since a plurality of cushion members 25 are separately attached to the disk accommodating portion 23, it is difficult to align the height of each the cushion member 25 to be flush with one another. Accordingly, the disk may be placed askew to thereby cause malfunction when placed on a turntable in the deck 10. Furthermore, after long use, the cushion members 25 may become detached from the disk accommodating portion 25 due to repeated contact with the disk.

SUMMARY OF THE INVENTION

To solve the above problems, it is an objective of the present invention to provide a disk tray for a disk player which can protect a disk accommodated in a disk accommodating portion and reduce damage generated by long use.

Accordingly, to achieve the above objective, there is provided a disk tray for a disk player including a tray main body installed on a disk player main body to be capable of moving a disk in and out of the disk player main body, and having a disk accommodating portion which is indented to accommodate a disk, and a protective layer formed on the surface of the disk accommodating portion facing an accommodated disk for protecting the disk placed on the disk accommodating portion.

BRIEF DESCRIPTION OF THE DRAWINGS

The above objective and advantages of the present invention will become more apparent by describing in detail a preferred embodiment thereof with reference to the attached drawings in which.

DETAILED-DESCRIPTION OF THE INVENTION

Figure 2:
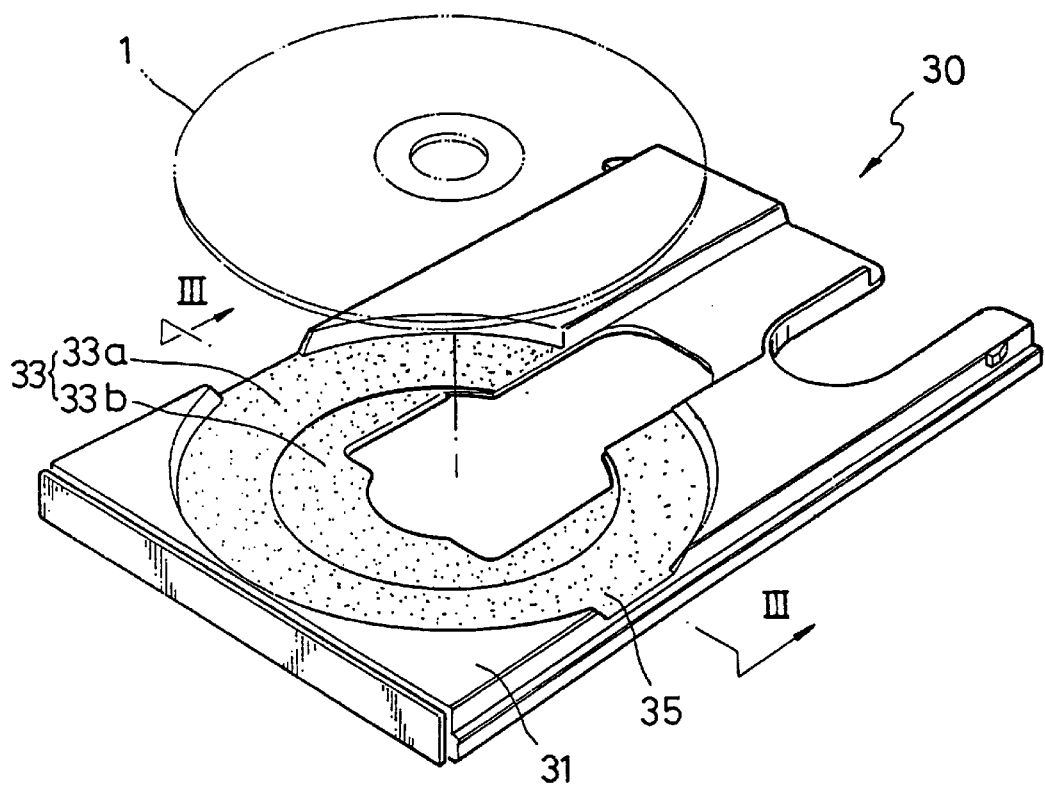
FIG. 2 is a perspective view illustrating a disk tray for a disk player according to a preferred embodiment of the present invention.
Figure 3B:
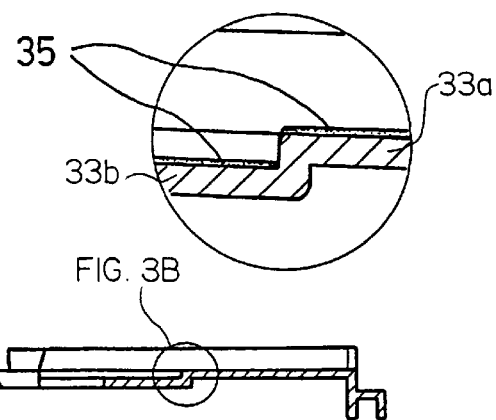
FIGS. 3A and 3B are sectional views taken along line III—III of FIG. 2.
Figure 3A:
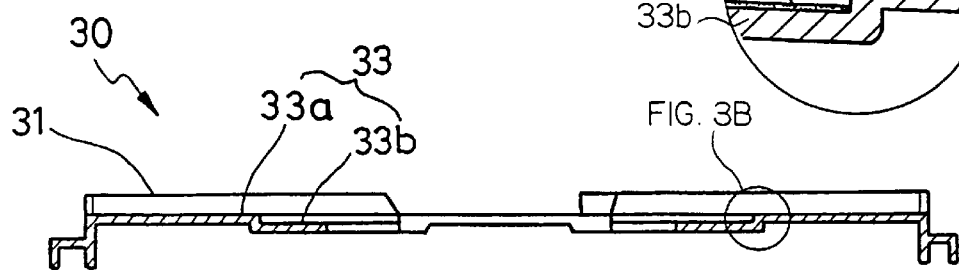

Referring to FIGS. 2, 3A and 3B, a disk tray 30 for a disk player according to a preferred embodiment of the present invention has a tray main body 31 having a disk accommodating portion 33 and a protective layer 35 formed on the upper surfaces of the disk accommodating portion 33 which face a disk 1.

Figure 1:
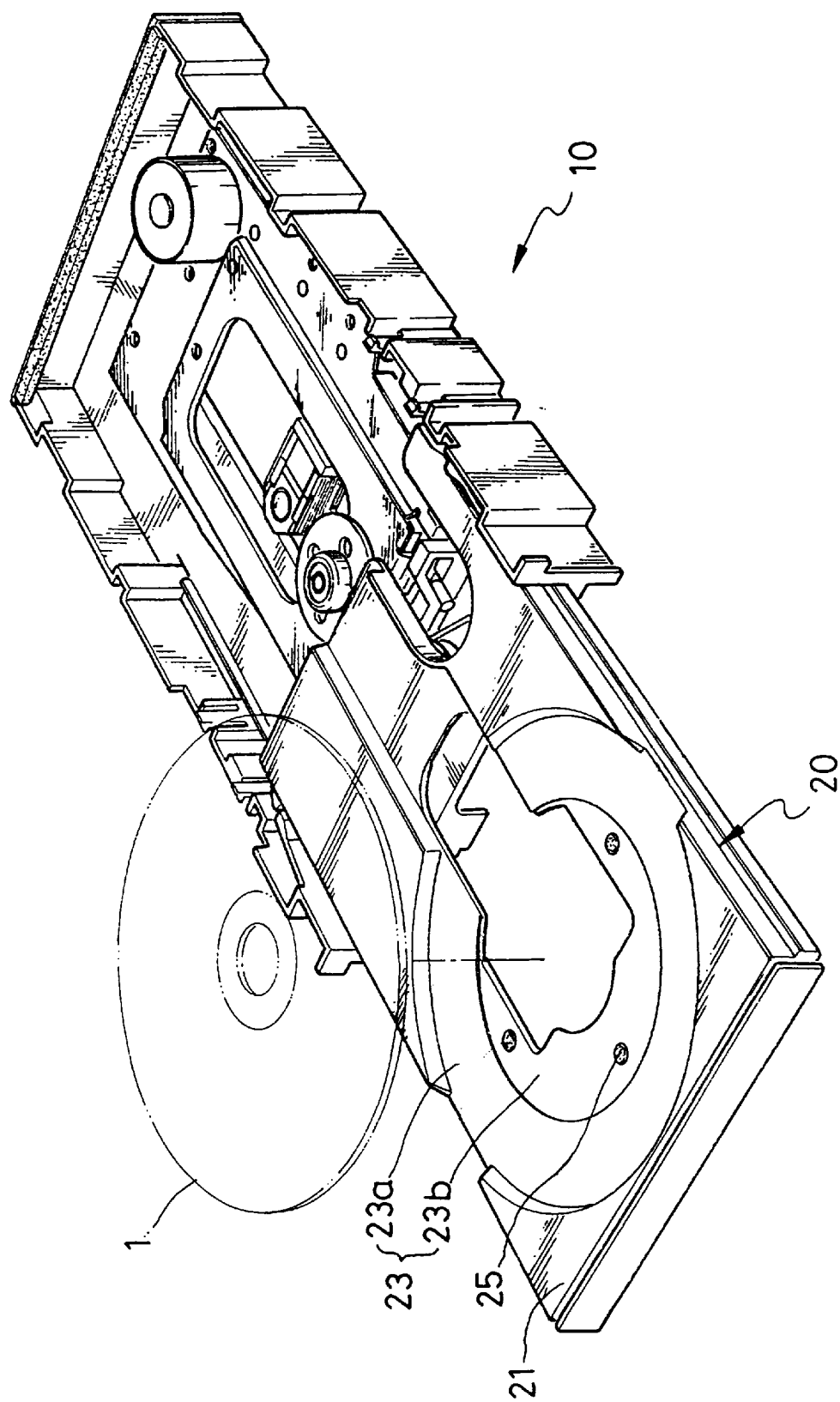
FIG. 1 is a perspective view illustrating a disk player having a conventional disk tray.

The tray main body 31 is installed on the deck 10 of a disk player (see FIG. 1) so as to move with respect to the main body of the disk player. The disk accommodating portion 33 is comprised of first and second disk accommodating portions 33a and 33b each having a different depth and diameter corresponding to disks of different diameters. That is, the first disk accommodating portion 33a is for accommodating a 120 mm diameter disk and the second disk accommodating portion 33b is for accommodating a 80 mm diameter disk. The second disk accommodating portion 33b is formed to be further indented to a depth eater than that of the first disk accommodating portion 33a.

The protective layer 35 is formed on the first and second disk accommodating portions 33a and 33b by coating the upper surfaces thereof such that the surfaces of the first and second disk accommodating portions become softer than that of the tray main body 31. In particular, the protective layer 35 is coated to cover the surfaces of the first and second disk accommodating portions 33a and 33b to have the same thickness. Thus, the disk 1 accommodated in the disk accommodating portions 33a and 33b is prevented from being askew.

Preferably, the protective layer 35 is formed of urethane resin, which exhibits superior coating performance in weather resistance, solution resistance, chemical resistance and abrasion resistance. The urethane resin can also be coated to a sufficient thickness to protect the disk 1 by a single coating process, without generation of bubbles or flowing.

In the coating process of the protective layer 35, a coating substance formed of urethane resin is sprayed on the disk accommodating portion 33 of the tray main body 31 to a predetermined thickness, dried at a temperature of 60° C. for about thirty minutes, and finally, cured at room temperature for about one week.

It is preferable that the protective layer 35 has a uniform thickness of approximately 20 through 50 $\mu$m in order to restrict idle rotation of the disk 1 and dampen impacts delivered to the disk 1 which is accommodated in the disk accommodating portion 33. Particularly, considering the coating process, it is preferable that the protective layer 35 has a uniform thickness of approximately 25 through 35 $\mu$m.

As described above, in the disk tray 30 for a disk player having the above structure according to the present invention, since the disk 1 accommodated in the disk accommodating portion 33 is supported with a buffer, damage to the disk 1 as well as idle rotation of the disk 1 when released from a turntable (not shown) of a disk player during unloading can be prevented. Also, since the protective layer 35 is formed on the disk accommodating portion 33 to have a uniform thickness, the disk 1 accommodated therein can be maintained in level position. Further, since the protective layer 35 is formed by being coated on the disk accommodating portion 33, there is little possibility of detachment of the protective layer 35 from the tray main body 31 after long use.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. A disk tray for a disk player comprising:

a tray main body installed on a disk player main body for carrying a disk in and out of said disk player main body, and having a disk accommodating portion with an indented surface to accommodate a disk; and a protective layer coated on the entire surface of said disk accommodating portion facing an accommodated disk for protecting the accommodated disk placed on said disk accommodating portion, wherein a thickness of said protective layer is approximately 20 through 50 $\mu$m for restricting idle rotation of the disk and dampening impacts delivered to the disk.

2. The disk tray as claimed in claim 1, wherein said disk accommodating portion comprises first and second disk accommodating portions having different diameters, said first and second disk accommodating portions each having different depths in order to accommodate different disk sizes, and wherein said protective layer is coated on entire surfaces of said first and second disk accommodating portions that face an accommodated disk.

3. The disk tray as claimed in claim 1, wherein said protective layer is formed of urethane resin, which is coated on the surface of said disk accommodating portion.

* * * * *